G. CARACCIO.
COCK.
APPLICATION FILED MAY 27, 1919.

1,361,826.

Patented Dec. 14, 1920.

INVENTOR
G. Caraccio,
By H. R. Kerslake
ATTORNEY

UNITED STATES PATENT OFFICE.

GIOVANNI CARACCIO, OF GENOA, ITALY.

COCK.

1,361,826.  Specification of Letters Patent.  Patented Dec. 14, 1920.

Application filed May 27, 1919. Serial No. 300,198.

*To all whom it may concern:*

Be it known that I, GIOVANNI CARACCIO, a subject of the King of Italy, and residing at Genoa, Italy, have invented a new and useful Improvement in Cocks, of which the following is a specification.

The principal object of the present invention is to provide a cock of a simple and cheap construction made of a minimum number of pieces which can be readily taken apart without any skill and without requiring tools when the cock requires to be cleaned or supplied with a new packing when leaking.

According to the present invention the cock body is provided with a threaded head having a level face perpendicular to its axis to serve as a valve seat and a nozzle head supplied with a liquid passage and internal threads corresponding with the threads of the cock body and a valve supported on and not fastened to the nozzle head, so that in rotating this head the valve will be tightly pressed against the valve seat or distanced from the said seat.

The invention is illustrated in the accompanying drawing in which:—

Figure 1:
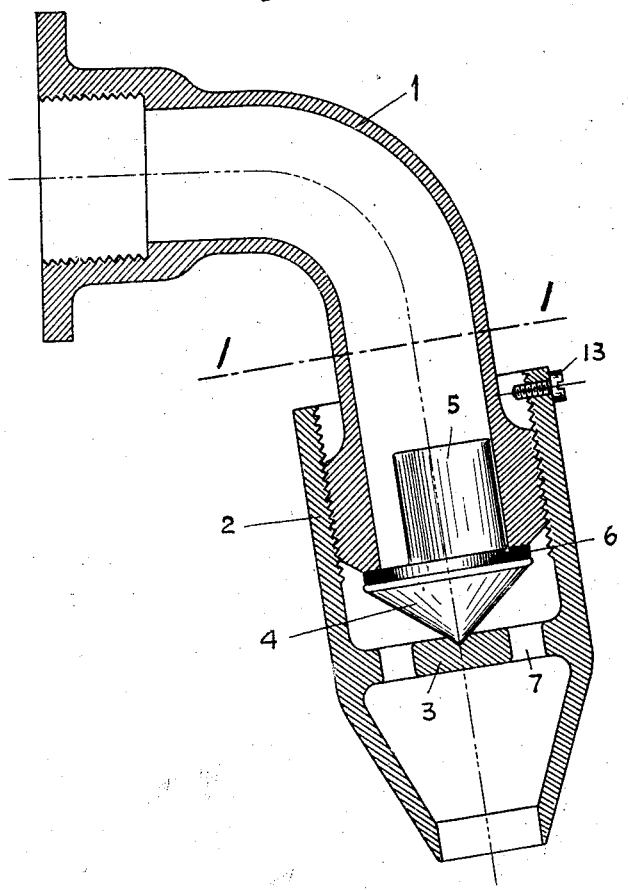
Figure 2:
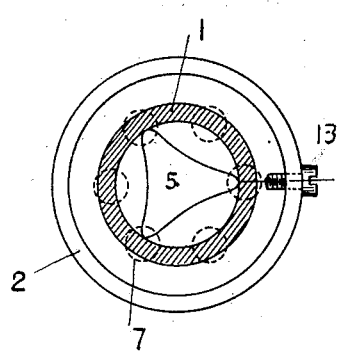

Figure 1 is a vertical sectional view, and Fig. 2 is a cross section on the line 1—1 of Fig. 1.

In the Figs. 1 and 2, 1 is a tubular curved cock body which may be fastened at one end by a tap or by bracing to a conduit and having its other end provided with an externally threaded head and this head supplied with a level face perpendicular to the axis of this head. On the threaded head of the cock is applied a nozzle head 2 having an interior liquid passage and this head is also supplied with a tap corresponding with the threads of the cock body. On the nozzle head 2 is supported the valve 4 which penetrates with the pointed end of its conical shaped outer portion a cavity of the cross wall 3 situated in the center line of the nozzle head. The valve 4 penetrates with a projection 5 within the bore of the cock body. This projection is of triangular section and shaped so as to leave free spaces for the passage of the fluid and to allow the required clearance at the sides, with the bore of the cock body. 6 is a rubber ring which serves as packing. 7 are holes in the wall 3 for the passage of the fluid.

13 are threaded pins applied on the nozzle head 2 in order to hinder the fraudulent subtraction of the nozzle head.

Having now particularly described and ascertained the nature of my said invention and in what manner the same is to be performed, I declare what I claim is:—

An improved cock comprising an externally threaded cock body having a level face perpendicular to its axis to serve as a valve seat and a tapped nozzle head having an internal fluid passage and a cross wall applied on the threaded cock body and a valve having a conical outer end freely supported with said end within a cavity on the axis of said cross wall and having at its other end a projection penetrating for the purpose of centration, the bore of the cock body.

In testimony whereof I have signed my name to this specification in the presence of two subscribing witnesses.

DR. GIOVANNI CARACCIO.

Witnesses:
  WOLFE WEBER,
  WILLIAM P. SCHOCKLEY.